(12) United States Patent
Yoshida

(10) Patent No.: US 10,998,934 B2
(45) Date of Patent: May 4, 2021

(54) INFORMATION PROCESSING APPARATUS AND IMAGE READING APPARATUS

(71) Applicant: CANON KABUSHIKI KAISHA, Tokyo (JP)

(72) Inventor: Satoshi Yoshida, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/739,722

(22) Filed: Jan. 10, 2020

(65) Prior Publication Data

US 2020/0235782 A1 Jul. 23, 2020

(30) Foreign Application Priority Data

Jan. 18, 2019 (JP) .............................. JP2019-006644

(51) Int. Cl.
*H04B 3/52* (2006.01)
*H04B 3/54* (2006.01)
*H01P 3/16* (2006.01)
*H01P 3/10* (2006.01)

(52) U.S. Cl.
CPC ................. *H04B 3/52* (2013.01); *H01P 3/10* (2013.01); *H01P 3/16* (2013.01); *H04B 3/54* (2013.01); *H04B 2203/5441* (2013.01)

(58) Field of Classification Search
CPC ... H04B 1/04; H04B 1/40; H04B 3/36; H04B 3/54; H04B 3/52; H01P 3/16
USPC .......................................................... 375/257
See application file for complete search history.

(56) References Cited

U.S. PATENT DOCUMENTS

| | | | |
|---|---|---|---|
| 2002/0033686 A1* | 3/2002 | Uhl ........................ | G05B 19/02 318/560 |
| 2002/0057472 A1* | 5/2002 | Kono ................... | H04N 1/0083 358/530 |
| 2006/0098369 A1* | 5/2006 | Wambsganss ............ | H02J 1/06 361/100 |
| 2008/0123773 A1* | 5/2008 | Igarashi ............. | H04N 1/32603 375/296 |
| 2010/0322296 A1* | 12/2010 | Lam ........................ | H04L 27/01 375/222 |
| 2013/0207455 A1* | 8/2013 | Doljack ................. | H01H 35/00 307/9.1 |
| 2016/0056905 A1* | 2/2016 | Hartlmueller ......... | H04J 3/0697 375/354 |

(Continued)

FOREIGN PATENT DOCUMENTS

JP 2006-128969 5/2006

*Primary Examiner* — Emmanuel Bayard
(74) *Attorney, Agent, or Firm* — Venable LLP

(57) ABSTRACT

An image reading apparatus includes an image reader, an image controller, and an FFC configured to connect the image controller and the image reader to each other. The FFC includes a first signal line, a second signal line, and a third signal line. The image reader includes a loop back portion configured to return a signal transmitted from the image controller through the first signal line back to the image controller through the second signal line. The third signal line forms a feedback portion configured to return a signal output from the image controller back to the image controller before the signal is received by the image reader. The image controller is configured to detect an abnormality in a cable, the image reader, and the image controller based on diagnosis results obtained with use of the loop back portion and the feedback portion.

16 Claims, 3 Drawing Sheets

(56) References Cited

U.S. PATENT DOCUMENTS

2017/0061266 A1\* 3/2017 Shimizu ............. G06K 15/4045
2017/0094067 A1\* 3/2017 Ishi .......................... H04N 1/23
2018/0190218 A1\* 7/2018 Jang .................... G09G 3/3607

\* cited by examiner

INFORMATION PROCESSING APPARATUS AND IMAGE READING APPARATUS

BACKGROUND OF THE INVENTION

Field of the Invention

The present disclosure relates to an image reading apparatus including an information processing apparatus configured to diagnose a connection state and a failure state of an image reader, which is configured to read an image from a document, and an image controller, which is configured to control operation of the image reader.

Description of the Related Art

An image reader and an image controller are configured to connect to each other through a flexible flat cable (hereinafter referred to as the "FFC"), for example, for communication. The image reader is configured to perform a reading operation while moving, when an image is to be read from a document placed on a document table. In general, the FFC is formed by bundling a plurality of signal lines together as one cable, and is suitable for connection between the movable image reader and the image controller. In such an FFC in the related art, signal lines for detecting a break and disconnection are provided at both ends in a width direction of the FFC. An image reading apparatus is configured to detect the break and disconnection of the FFC by detecting an electrical connection state of the signal lines. The FFC can be used as electrical wiring between parts inside various electric appliances without limiting to the image reading apparatus.

In Japanese Patent Application Laid-open No. 2006-128969, there is disclosed an abnormality diagnostic device (information processing apparatus) configured to diagnose a connection state using signal lines at both ends in a width direction of an FFC. The information processing apparatus is configured to diagnose the connection state of the FFC by transmitting a signal from a signal line at one end in the width direction of the FFC and determining whether the signal is received by a signal line at the other end. In an FFC, signal lines at ends in the width direction may be broken when stress is applied on the ends in the width direction due to stress or contact with a surrounding metal sheet. In this case, the information processing apparatus in Japanese Patent Application Laid-open No. 2006-128969 is useful. Further, the information processing apparatus of Japanese Patent Application Laid-open No. 2006-128969 can detect a disconnected state, for example, an unattached FFC, before an abnormality diagnosis is performed.

However, with the information processing apparatus of Japanese Patent Application Laid-open No. 2006-128969, the signal lines at both ends in the width direction of the FFC are lines dedicated to the diagnosis of the connection state, and various signals are not transmitted therethrough. Further, even in a case where it is determined that the connection state of the FFC is normal using the signal lines, when a connection state of signal lines through which signals are actually transmitted is abnormal, a communication failure may occur between an image controller and an image reader. In this case, it becomes difficult to identify a cause of an operation abnormality of an image reading apparatus. Therefore, it takes time for identification and repair of a failure point, replacement of a part, and other operations by a service person. It is an object of the present disclosure to provide an image reading apparatus configured to identify a failure point when a communication failure occurs between parts.

SUMMARY OF THE INVENTION

An information processing apparatus according to the present disclosure includes: a first substrate having a controller mounted thereon; a second substrate having a processor mounted thereon; a cable connected to the first substrate and the second substrate, the cable having a plurality of signal lines including a first signal line, a second signal line, and a third signal line; a loop back portion configured to return a signal transmitted from the controller through the first signal line back to the controller through the second signal line; and a feedback portion configured to return a signal output from the controller back to the controller before the signal is received by the second substrate, wherein the controller and the processor are configured to communicate to/from each other through the cable; and wherein the controller is configured to identify an abnormality of the cable, an abnormality of the controller, and an abnormality of the processor based on a result of the communication, a diagnosis result obtained using the loop back portion, and a diagnosis result obtained with use of the feedback portion.

Further features of the present invention will become apparent from the following description of exemplary embodiments (with reference to the attached drawings).

DESCRIPTION OF THE EMBODIMENTS

At least one embodiment of the present disclosure is described below in detail with reference to the drawings.

Figure 1:
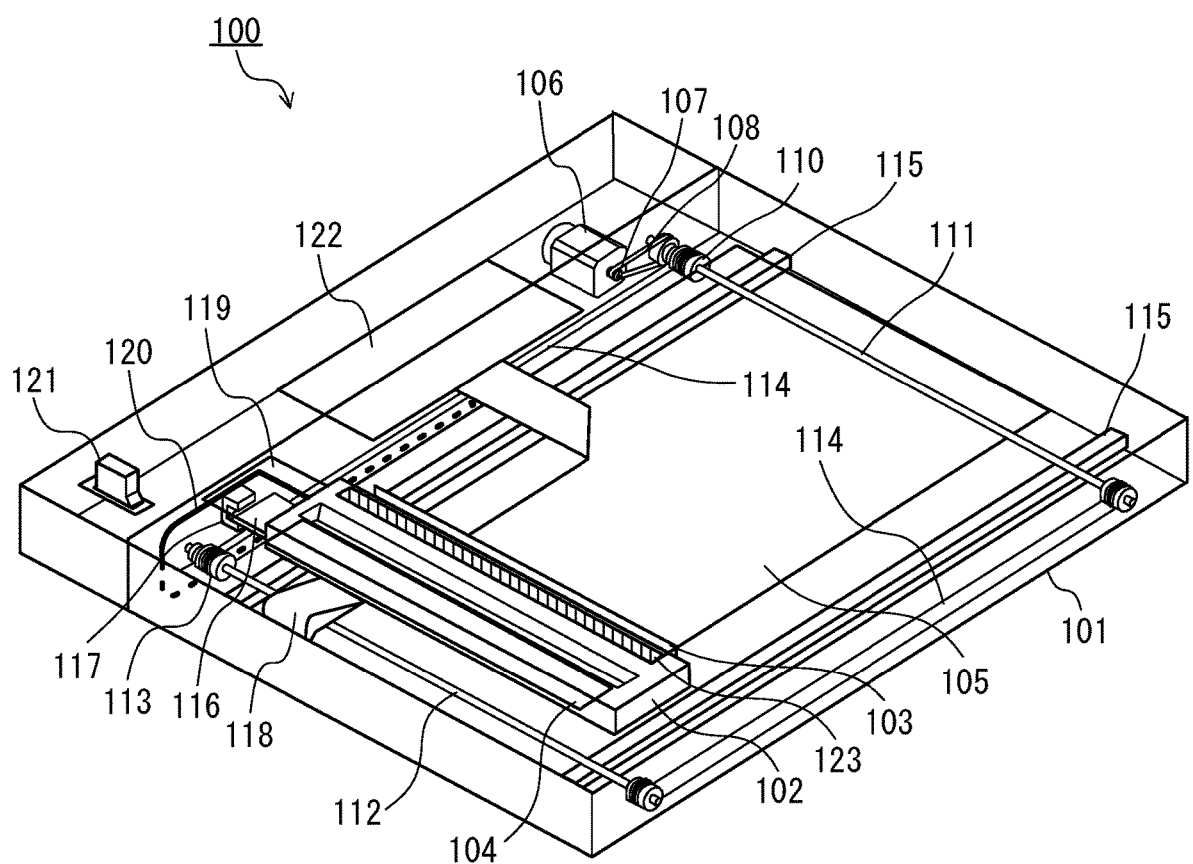
FIG. 1 is an explanatory view of a configuration of an image reading apparatus according to at least one embodiment of the present disclosure.

FIG. 1 is an explanatory view of a configuration of an image reading apparatus including an information processing apparatus, which is configured to perform an abnormality diagnosis, according to at least one embodiment. An image reading apparatus 100 includes, in a reader frame 101 serving as a housing, a carriage 102 configured to scan a document to read an image from the document, and an image controller 122 configured to control operation of the image reading apparatus 100. The reader frame 101 includes a document table glass 105, on which the document from which the image is to be read is to be placed. The reader frame 101 includes a flow reading glass 104, which serves as a reading position when a document is conveyed from an auto document feeder (hereinafter referred to as the "ADF", not shown). The image reading apparatus 100 includes an open/close detection lever 121 configured to detect opening/closing of the ADF or a pressure plate (not shown).

The carriage 102 includes an image reader 103 and a document illuminator 123 including white light emitting diodes (LEDs) or other light emitting elements as a light source. The image reader 103 and the document illuminator 123 are mounted on different substrates, respectively. The document illuminator 123 is a light emitter configured to irradiate the document with light when the document is scanned. The document illuminator 123 is subjected to light emission control to be turned on or off by the image controller 122. The image reader 103 includes a light receiver configured to receive light radiated by the document illuminator 123 and reflected by the document. The image reader 103 is configured to generate image data expressing the image of the document based on the received reflected light. The image reader 103 is electrically connected to the image controller 122 through a flexible flat cable (FFC 118) formed by bundling a plurality of signal lines together. The image reader 103 is configured to transmit the generated image data to the image controller 122 through the FFC 118 by serial communication. The image reader 103 is configured to acquire instructions to control various operations from the image controller 122 through the FFC 118 by serial communication. The image reader 103 is configured to make various settings during image reading and perform light emission control on the document illuminator 123 based on the acquired instructions to control operations.

The carriage 102 is movable on rails 115. A flag 116 is added to the carriage 102. The image reading apparatus 100 includes an HP detector 117 to detect a position (HP position) to be used as a reference when the carriage 102 scans the document. The HP detector 117 is a photo interrupter, for example. The HP detector 117 is configured to detect that the carriage 102 has reached the HP position when an optical path between a light emitting element and a light receiving element is blocked by the flag 116 of the carriage 102. A result of the detection by the HP detector 117 is transmitted to the image controller 122.

The image controller 122 is formed by an application specific integrated circuit (ASIC) or other semiconductor device being mounted on a substrate or the like. In addition to controlling the operation of the image reader 103 and the document illuminator 123 as described above, the image controller 122 is configured to control movement of the carriage 102 on the rails 115. A configuration for moving the carriage 102 on the rails 115 includes an optical motor 106, a timing belt 108, reels 110 and 113, driving shafts 111 and 112, and wires 114.

The image controller 122 is configured to drive and control the optical motor 106 by controlling a motor driver by a module configured to control a motor. The optical motor 106 is a stepping motor, for example. The optical motor 106 has a pulley 107, around which the timing belt 108 is stretched, press-inserted into a motor shaft thereof. Driving force generated when the optical motor 106 is rotated is transferred to a gear (not shown) adjacent to the reel 110 through the timing belt 108. The reel 110 has a wire 114 wound therearound, and has the driving shaft 111 connected thereto. Between the reel 110 and the reel 113, which is arranged at a position that is symmetric with respect to the driving shaft 111 and is connected to the driving shaft 112, the wire 114 is stretched. To the wires 114, the carriage 102 is fixed with fittings (not shown). When the reel 110 is rotated by a driving force from the optical motor 106, the wires 114 are rotated, and the carriage 102 is moved on the rails 115. When an image is to be read from a document placed on the document table glass 105, the carriage 102 performs a reading operation while moving on the rails 115. A direction (movement direction of the carriage 102) in which the rails 115 extend is a sub-scanning direction. When an image is to be read from a document conveyed from the ADF, the carriage 102 is fixed below the flow reading glass 104.

Electric power to be consumed in the carriage 102 is supplied through a power supply line 120. The power supply line 120 is routed on the far side of the image reading apparatus 100 by a guide plate 119. The guide plate 119 is configured to guide the power supply line 120 to a different path separately from the wires 114 and the FFC 118. The power supply line 120 may be eliminated by using a signal line included in the FFC 118 for power supply.

Hereinafter, the details of sliding movement of the FFC 118 is described. The FFC 118 has one end connected to a connector mounted on the image reader 103, and another end connected to a connector mounted on the image controller 122. When an image is to be read from a document placed on the document table glass 105, the carriage 102 is moved from the HP position to an end of the document in the sub-scanning direction. As a result, the FFC 118 slides inside the reader frame 101 with the movement of the image reader 103 from the HP position to the end of the document in the sub-scanning direction. When an image is to be read from a document conveyed from the ADF, the image reader 103 is moved from the HP position to below the flow reading glass 104 and is stopped. As a result, the FFC 118 slides inside the reader frame 101 only when the image reader 103 is moved, and does not slide during image reading. The FFC 118 becomes more likely to be damaged by sliding. When a signal line inside the FFC 118 is broken, the broken part may be or may not be electrically connected depending on a posture of the FFC 118. In other words, a bending portion and a degree of bending of the FFC 118 are changed by sliding. Therefore, in one posture, the broken part is electrically disconnected, and, in another posture, the broken part is still electrically connected.

Figure 2A:
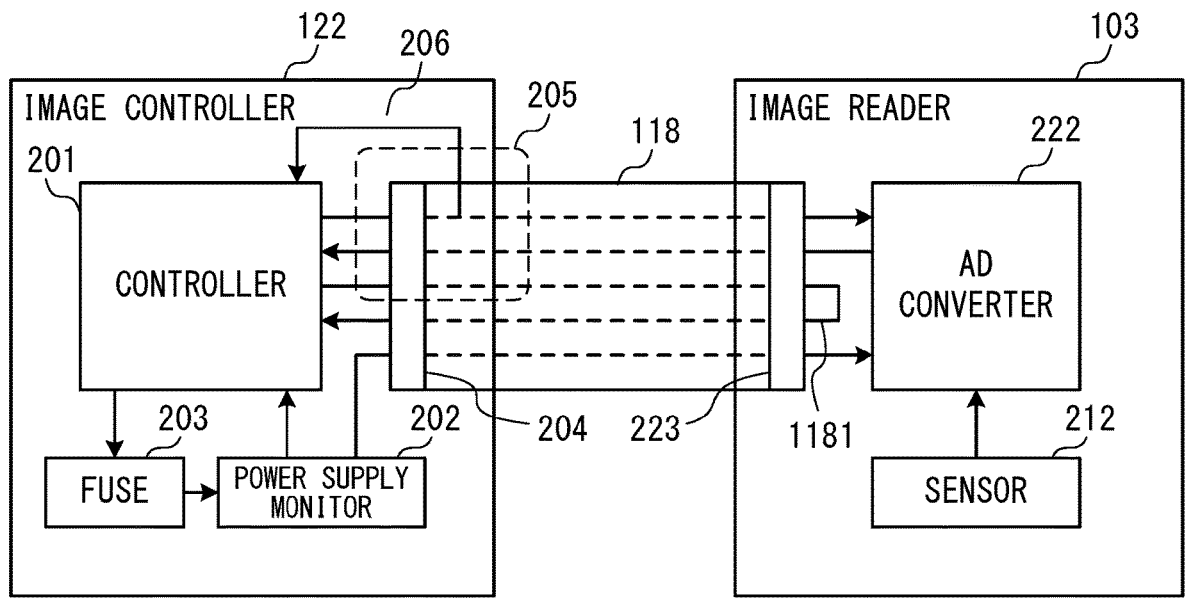
FIG. 2A, FIG. 2B, and FIG. 2C are explanatory diagrams of a connection state between an image controller and an image reader.
Figure 2B:
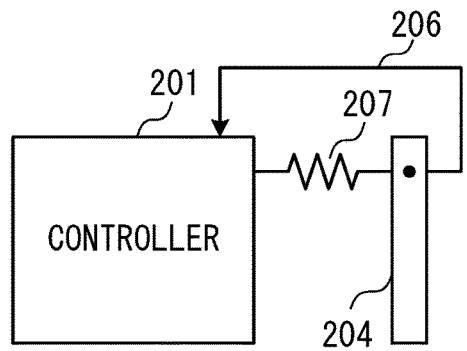
Figure 2C:
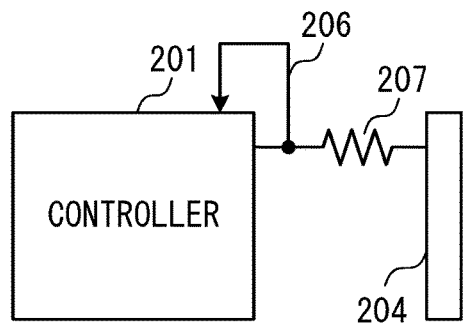

FIG. 2A to FIG. 2C are explanatory diagrams of a connection state between the image controller 122 and the image reader 103. In FIG. 2A, the connection state between the image controller 122 and the image reader 103 is illustrated. FIG. 2B is an enlarged diagram of a feedback portion 205, which is provided in the image controller 122 and is to be described later. In FIG. 2C, a modification example of the feedback portion 205 is illustrated.

The image reader 103 includes a sensor 212 and an AD converter 222. The sensor 212 is a light receiver formed of a light receiving element configured to receive and photoelectrically convert light reflected by the document to generate an analog signal. The AD converter 222 is an analog front end (AFE) configured to convert the reflected light, which has been converted into the analog signal by the sensor 212, into a digital signal to generate the image data. The AD converter 222 may perform various kinds of image processing depending on set conditions when generating the image data. The AD converter 222 is connected to the image controller 122 by the FFC 118 including the plurality of signal lines. Instructions to control operations of, and various settings made to, the image reader 103 and the document illuminator 123 by the image controller 122 are performed via the AD converter 222.

The image controller 122 includes a controller 201 configured to control operation of the image reading apparatus 100, a power supply monitor 202 configured to monitor a power supply state from the image controller 122 to the image reader 103, and a fuse 203. The controller 201, the power supply monitor 202, and the fuse 203 have an abnormality diagnostic function. The controller 201 is connected to the image reader 103 (AD converter 222) through the FFC 118. The controller 201 and the AD converter 222 perform serial communication to/from each other through the FFC 118. The controller 201 is also configured to receive a detection signal indicating a detection result from the HP detector 117 to perform the above-mentioned control to move the carriage 102.

Serial communication lines connecting the controller 201 and the AD converter 222 are formed of wirings from the controller 201 to a connector 204 inside the image controller 122, the FFC 118, and wirings from a connector 223 to the AD converter 222 inside the image reader 103. Some wirings (serial communication lines) of a plurality of wirings connected to a terminal of the connector 204 are branched out to the FFC 118 direction and the controller 201 direction. A serial communication line (hereinafter referred to as "feedback line 206") branched out to the controller 201 direction forms the feedback portion 205 configured to return a signal output from the controller 201 back to the controller 201.

Hereinafter, the details of the feedback portion 205 is described. In the following description, it is assumed that a signal from the controller 201 to the AD converter 222 is transmitted, with the controller 201 side being defined as "upstream", and the AD converter 222 side being defined as "downstream". On the serial communication line from the controller 201 to the connector 204, an electric component 207 (resistor in this case) is provided.

In FIG. 2B, which is the enlarged diagram of the feedback portion 205, a branch portion of the serial communication lines is provided inside the connector 204 on the downstream side of the electric component 207, or in the vicinity of the downstream side (FFC 118 side) of the connector 204. With the serial communication lines branching out to the feedback line 206 and the FFC 118 inside the connector 204 or on the downstream side of the connector 204, the signal is returned to the controller 201 via the electric component 207 and the connector 204. The controller 201 can detect a failure in the wirings from the controller 201 to the connector 204 and in the electric component 207 as an abnormality of the image controller 122 by checking the signal acquired through the feedback line 206.

In FIG. 2C, the modification example of the feedback portion 205 illustrated in FIG. 2B is illustrated. In FIG. 2C, which is the enlarged diagram of the feedback portion 205, the branch portion of the serial communication lines is provided on the upstream side of the electric component 207. With the serial communication lines branching out to the feedback line 206 and the serial communication lines to the AD converter 222 on the upstream side of the electric component 207, a signal that does not pass through the electric component 207 and the connector 204 is returned to the controller 201. Therefore, through checking the signal acquired through the feedback line 206, an abnormality of the controller 201 can be detected as an abnormality of the image controller 122.

However, the controller 201 of FIG. 2C cannot detect a failure that has occurred in a wiring from the controller 201 to the connector 204 or in the electric component 207 based on the signal acquired through the feedback line 206.

In view of the above, it is preferred that the branch portion of the feedback portion 205 is provided, as illustrated in FIG. 2B, as close to the downstream side in the image controller 122 as possible, for example, within the connector 204 or on the downstream side of the connector 204.

The FFC 118 includes, at an end to which the connector 223 is connected, a loop back portion 1181 configured to detect disconnection and a break of the FFC 118. The loop back portion 1181 is configured to connect wirings for signals output from the controller 201 to be looped in the image reader 103 and returned to the controller 201, and two signal lines in the FFC 118 connected by the wirings.

In the loop back portion 1181, the signal lines in the FFC 118 through which signals are transmitted from the controller 201 to the image reader 103 are different from the signal lines in the FFC 118 that are looped to transmit signals from the image reader 103 to the controller 201. In FIG. 2A, the signals are transmitted from the controller 201 to the image reader 103 through signal lines in a center portion of the FFC 118, and the signals are transmitted from the image reader 103 to the controller 201 through signal lines adjacent to the signal lines. The controller 201 transmits signals and receives the signals by the loop back portion 1181 to detect whether the FFC 118 is connected or not. In other words, with such a loop back portion 1181, the controller 201 can detect human errors, such as halfway attachment and oblique attachment of the FFC 118.

The connection of the FFC 118 is detected when the power is turned on, or before image reading processing is started. Further, the connection of the FFC 118 is detected at predetermined time intervals (for example, every 100 milliseconds) while the FFC 118 is sliding during the image reading. As a result, the controller 201 can check a break of the FFC 118 during sliding. The predetermined time is set depending on a movement speed of the image reader 103. Alternatively, the controller 201 may continuously detect the connection during the image reading.

The controller 201 can write data to the AD converter 222, and read and check the data written in the AD converter 222. The controller 201 can check whether the data is normally written in the AD converter 222 by writing predetermined data to, and reading the written data from, the AD converter 222. Such processing is called "verification".

The controller 201 performs serial communication to set a register of the AD converter 222 before starting the image reading processing. The controller 201 performs verification before setting the register. When it is determined that, as a result of the verification, data cannot be normally written the controller 201 switches an operation mode to a failure diagnostic mode for identifying a failure point.

The verification may be performed not only before the image reading processing is started but also when the power is turned on or after the image reading processing is finished. Through performing the verification when the power is turned on, the controller 201 can detect an occurrence of an abnormality before the image reading processing is started. Through performing the verification after the image reading processing is finished, the controller 201 can check whether a signal line has broken by the sliding of the FFC 118.

The image controller 122 is configured to supply electric power to the image reader 103 through the FFC 118. The fuse 203 is a protection element configured to be melted and stop the electric power supply when an electric current of a predetermined amount or more flows through a supply line of the electric power. When occurrence of an abnormality is confirmed by the verification, the power supply monitor 202 checks whether the fuse 203 has been melted. The AD converter 222 of the image reader 103 operates on the electric power supplied from the image controller 122, and hence, when the occurrence of the abnormality is confirmed by the verification, the fuse 203 may be melted and the electric power may not be supplied. Therefore, when the occurrence of the abnormality is confirmed by the verification, the power supply monitor 202 checks the melting of the fuse 203.

Figure 3:
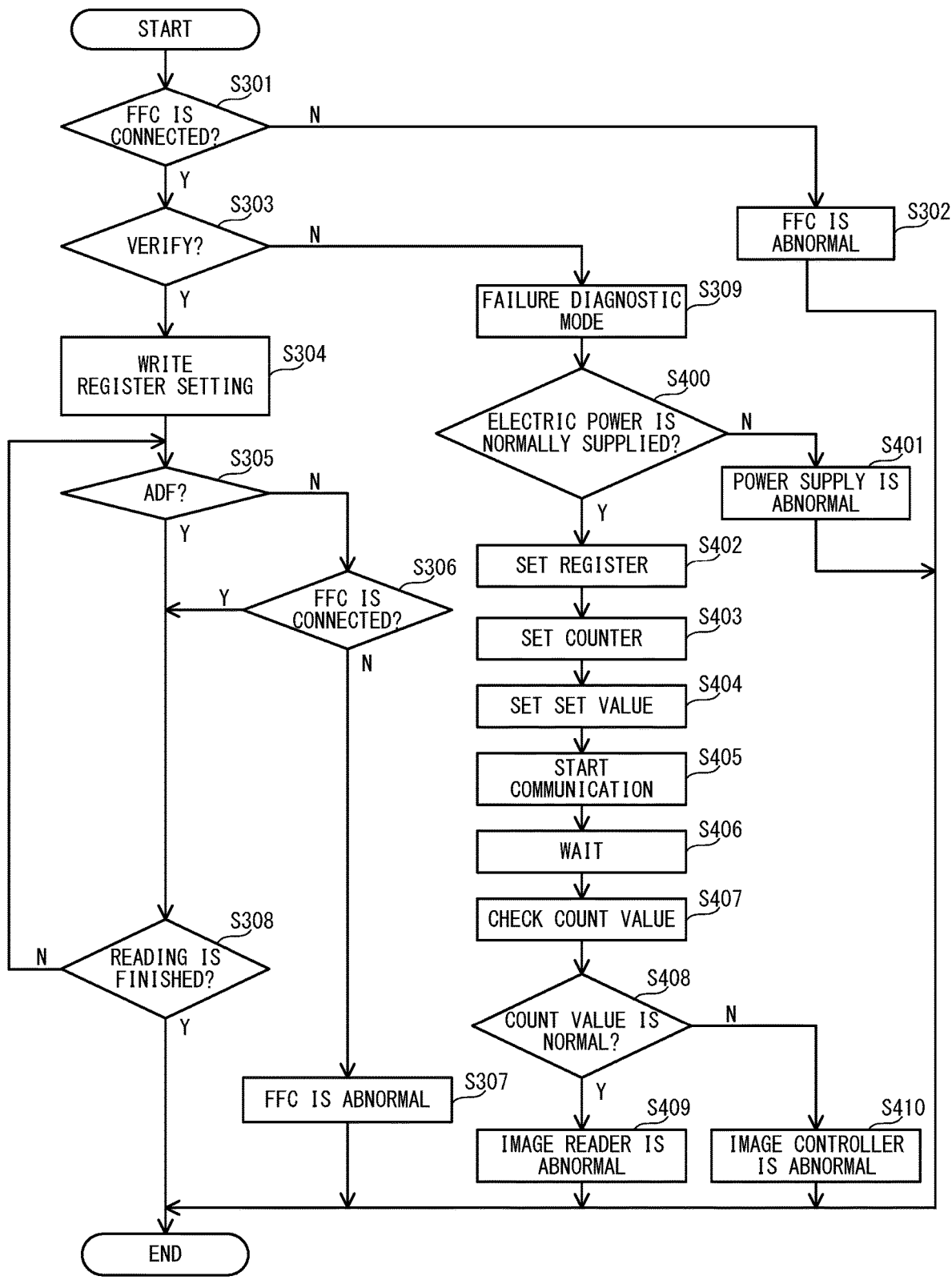
FIG. 3 is a flow chart for illustrating image reading processing.

FIG. 3 is a flow chart for illustrating the image reading processing to be performed by the image reading apparatus 100. This processing is executed when a document is set, and an instruction to read an image is input from an operation unit, a personal computer, or another external device (not shown), for example. The setting of a document means placement of a document on the document table glass 105 or placement of a document on a tray of the ADF.

The controller 201 detects connection of the FFC 118 under a state in which the carriage 102 is at rest at the HP position with the use of the loop back portion 1181 (Step S301). When it is determined as a result of the connection detection that the FFC 118 is not connected (Step S301: N), the controller 201 determines that the FFC 118 is disconnected or broken. In this case, the controller 201 determines that the FFC 118 is abnormal (Step S302), and ends the processing without reading an image. The controller 201 provides a notification for providing an instruction to check a connection state of the FFC 118.

When the FFC 118 is connected (Step S301: Y), the controller 201 performs verification under a state in which the carriage 102 is at rest at the HP position (Step S303). When, as a result of the verification, that data is normally written (Step S303: Y), the controller 201 writes, in the AD converter 222, register settings for the image reader 103 to read an image (Step S304).

Thereafter, the controller 201 moves the carriage 102 to below a white reference plate (not shown) for shading. The controller 201 determines whether to perform pressure plate reading or ADF reading (Step S305). The pressure plate reading is reading processing in which the carriage 102 reads an image of a document placed on the document table glass 105 while moving in the sub-scanning direction inside the reader frame 101. The ADF reading is reading processing in which the carriage 102 reads an image of a document conveyed from the ADF without moving below the flow reading glass 104. This determination is made depending on information included in the instruction to read, a detection result of a sensor configured to sense placement of the document on the document table glass 105, or a detection result of a sensor configured to sense placement of a document on the tray of the ADF, for example.

In the case of the pressure plate reading (Step S305: N), the controller 201 detects the connection of the FFC 118 with the use of the loop back portion 1181 (Step S306). The connection detection in this case is performed continuously also in the image reading at predetermined time intervals (for example, every 100 milliseconds) or during the image reading. As a result of the connection detection, when it is determined that the FFC 118 is not connected (Step S306: N), the controller 201 determines that the FFC 118 is disconnected or broken. In this case, the controller 201 determines that the FFC 118 is abnormal (Step S307), and ends the processing without reading an image. The controller 201 provides the notification for providing the instruction to check the connection state of the FFC 118.

When the FFC 118 is connected (Step S306: Y), the controller 201 reads an image in a reading range corresponding to the size of the document, and when the processing of reading the image in the reading range is finished, ends the processing (Step S308: Y).

In the case of the ADF reading (Step S305: Y), the controller 201 fixes the carriage 102 to under the flow reading glass 104, and causes the image reader 103 to read an image of a document conveyed by the ADF. In this case, the FFC 118 does not slide. Therefore, it is not required of the controller 201 to detect the connection of the FFC 118. The controller 201 performs the reading processing until no more document is conveyed from the ADF (Step S308: N), and ends the processing when there is no more document (Step S308: Y).

As a result of the verification in Step S303, when the data is not normally written (Step S303: N), the controller 201 sets the operation mode to the failure diagnostic mode (Step S309). In the failure diagnostic mode, the controller 201 first checks whether electric power is normally supplied from the image controller 122 to the image reader 103 (Step S400). The controller 201 checks whether the electric power is normally supplied based on a result of checking for melting of the fuse 203 by the power supply monitor 202.

When it is determined that the electric power is not normally supplied (Step S400: N), the controller 201 determines that an abnormality has occurred in the power supply configured to supply the electric power (Step S401), and ends the processing. When an abnormality occurs in the power supply, there are possibilities of the melting of the fuse 203 of the image controller 122 and a short circuit of a part of the image reader 103. Therefore, when an abnormality occurs in the power supply, it is required to replace both of the substrate on which the image controller 122 is mounted and the substrate on which the image reader 103 is mounted.

When the electric power is normally supplied (Step S400: Y), the controller 201 sets a register configured to output predetermined data (Step S402). The controller 201 sets a counter configured to count the number of signals fed back by the feedback portion 205 (Step S403). The controller 201 sets a set value, which is the number of signals to be transmitted to the AD converter 222 through a signal line branched out to the feedback line 206 (Step S404). The controller 201 starts communication to/from the AD converter 222, and outputs predetermined signals (Step S405). The controller 201 waits until all signals are output and the communication is finished (Step S406). The controller 201 counts the number of signals fed back by the feedback portion 205 from the start to the end of the communication.

The controller 201 checks the number of counted signals (count value) (Step S407). The controller 201 determines whether the count value is normal by comparing the count value and the set value set in the processing of Step S404 (Step S408). The controller 201 determines that the count value is normal when the count value and the set value are the same value, and determines that the count value is abnormal when the count value and the set value are different.

When the count value is normal (Step S408: Y), the controller 201 determines that the signals are normally output from the controller 201. Therefore, the controller 201 determines that an abnormality has occurred in the image reader 103 (Step S409), and ends the processing. In this case, the substrate on which the image reader 103 is mounted is determined to have failed, and is replaced.

When the count value is abnormal (Step S408: N), the controller 201 determines that the signals are not normally output from the controller 201. Therefore, the controller 201 determines that an abnormality has occurred in the image controller 122 (Step S410), and ends the processing. In this case, the substrate on which the image controller 122 is mounted is determined to have failed, and is replaced.

The image reading apparatus 100 according to at least one embodiment as described above can check an abnormality of the FFC 118 and a communication failure between the image controller 122 and the image reader 103 by performing the connection detection of the FFC 118 and the verification before the image reading processing is started. When the communication failure is detected, the image reading apparatus 100 can perform failure diagnosis, and determine which of the image controller 122 and the image reader 103 is the part in which the abnormality has occurred. The determination result is notified to a service person. As a result, the service person can promptly perform an appropriate operation for the failed part.

Further, the image reading apparatus 100 detects a break in the FFC 118 during the image reading, which is performed while moving the carriage 102. As a result, the image reading apparatus 100 can detect the break caused by the sliding of the FFC 118 accompanying the movement of the carriage 102.

The above description has been made for the image reading apparatus 100, but the information processing apparatus according to at least one embodiment can perform an abnormality diagnosis of electrical wirings between two electric components inside another electric appliance. Of the two electric components, one serves as a controller, and the other serves as a controlled part to be controlled for operation by the controller, for example. As long as the environment allows the two electric components to be connected to each other by the FFC 118, and allows signals to be transmitted/received to/from each other, the electric component serving as the controller can operate as the above-mentioned controller 201. As a result, the electric component serving as the controller can perform the connection detection of the FFC 118, the verification, and the determination on the abnormality of electric power supply to detect a connection failure of the FFC 118 and a failed electric component.

Further, each of two electric components may serve as the above-mentioned controller. In a case where each of the electric components can serve as the controllers, when one serves as a controller, the other serves as the controlled part to be controlled for operation by the controller. The opposite is also possible. In this case, the FFC 118 includes loop back portions 1181 at both ends. The loop back portions 1181 at both ends are connected to different signal lines, respectively. For example, a first loop back portion connects a first signal line and a second signal line to form a loop in a second electric component. A second loop back portion connects a third signal line and a fourth signal line to form a loop in a first electric component. The first signal line, the second signal line, the third signal line, and the fourth signal line are different signal lines.

As long as the environment allows the two electric components to be connected to each other by the FFC 118, and allows signals to be transmitted/received to/from each other, the electric component serving as the controller can operate as the above-mentioned controller 201. As a result, the electric component serving as the controller can perform the connection detection of the FFC 118, the verification, and the determination on the abnormality of electric power supply to detect a connection failure of the FFC 118 and a failed electric component.

As described above, according to at least one embodiment of the present disclosure, it is possible to identify a failure point when a communication failure occurs between electric components connected by the FFC 118.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006644, filed Jan. 18, 2019 which is hereby incorporated by reference herein in its entirety.

What is claimed is:

1. An information processing apparatus, comprising:
a first substrate having a controller mounted thereon;
a second substrate having a processor mounted thereon;
a cable connected to the first substrate and the second substrate, the cable having a plurality of signal lines including a first signal line, a second signal line, and a third signal line;
a loop back portion configured to return a signal transmitted from the controller through the first signal line back to the controller through the second signal line; and
a feedback portion configured to return a signal output from the controller back to the controller before the signal is received by the second substrate,
wherein the controller and the processor are configured to communicate to/from each other through the cable; and
wherein the controller is configured to identify an abnormality of the cable, an abnormality of the controller, and an abnormality of the processor based on a result of the communication, a diagnosis result obtained using the loop back portion, and a diagnosis result obtained with use of the feedback portion.

2. The information processing apparatus according to claim 1, wherein, when the cable is normally connected, the controller checks whether data is normally written in the processor by writing data in the processor and reading the written data from the processor.

3. The information processing apparatus according to claim 1,
wherein the feedback portion includes a feedback line branching out from the third signal line and being connected to the controller, and
wherein the controller is configured to transmit signals to the third signal line, and check a connection state between the first substrate and the cable based on the number of transmitted signals and the number of signals received through the feedback line.

4. The information processing apparatus according to claim 1,
wherein the first substrate is configured to supply electric power to the second substrate through the cable,
wherein the first substrate includes a protection element configured to be melted to stop the electric power supply when an electric current of a predetermined amount or more flows through a supply line of the electric power, and a power supply monitor configured to check the melting of the protection element, and
wherein the controller is configured to check whether the electric power is normally supplied based on a result of checking the melting of the protection element by the power supply monitor.

5. The information processing apparatus according to claim 1,
wherein the feedback portion is formed of a feedback line branching out from the third signal line and being connected to the controller,
wherein the first substrate is configured to supply electric power to the second substrate through the cable,
wherein the first substrate includes a protection element and a power supply monitor, which is configured to check the melting of the protection element, and the protection element is configured to be melted to stop the electric power supply when an electric current of a predetermined amount or more flows through a supply line of the electric power, wherein the controller is configured to:
- detect a connection state of the cable at startup or before operation of the second substrate is started;
- end processing when the cable is not normally connected;
- check, when the cable is normally connected, whether data is normally written in the processor by writing data in the processor and reading the written data from the processor;
- operate the processor when the data is normally written in the processor;
- check, when the data is not normally written in the processor, whether the electric power is normally supplied based on a result of checking the melting of the protection element by the power supply monitor;
- end the processing when the electric power is not normally supplied; and
- transmit, when the electric power is normally supplied, signals to the third signal line, and check a connection state between the first substrate and the cable based on a number of transmitted signals and a number of signals received through the feedback line.

6. The information processing apparatus according to claim 5, wherein the controller is further configured to:
- determine, when the cable is not normally connected, that the cable is disconnected or broken;
- determine, when the electric power is not normally supplied, that an abnormality occurs in a power supply;
- determine, when the number of transmitted signals and the number of signals received through the feedback line are the same, that the second substrate is abnormal; and
- determine, when the number of transmitted signals and the number of signals received through the feedback line are different, that the first substrate is abnormal.

7. The information processing apparatus according to claim 1, wherein the cable is a flexible flat cable.

8. The information processing apparatus according to claim 1, wherein the signal returned back to the controller by the feedback portion is acquired from a point in the cable in front of the second substrate before the signal is received by the second substrate.

9. An image reading apparatus, comprising:
- an image reader configured to perform image reading processing, in which an image is read from a document;
- an image controller configured to control operation of the image reader;
- a cable, which is connected to the image controller and the image reader, and has a plurality of signal lines including a first signal line, a second signal line, and a third signal line;
- a loop back portion configured to return a signal transmitted from the image controller through the first signal line back to the image controller through the second signal line; and
- a feedback portion configured to return a signal output from the image controller back to the image controller before the signal is received by the image reader,
- wherein the image controller and the image reader are configured to communicate to/from each other through the cable; and
- wherein the image controller is configured to identify an abnormality of the cable, an abnormality of the image controller, and an abnormality of the image reader based on a result of the communication, a diagnosis result obtained with use of the loop back portion, and a diagnosis result obtained using the feedback portion.

10. The image reading apparatus according to claim 9, wherein, when the cable is normally connected, the image controller checks whether data is normally written in the image reader by writing data in the image reader and reading the written data from the image reader.

11. The image reading apparatus according to claim 9,
- wherein the feedback portion is formed of a feedback line branching out from the third signal line and being connected to the image controller, and
- wherein the image controller is configured to transmit signals to the third signal line, and check a connection state between the image controller and the cable based on a number of transmitted signals and a number of signals received through the feedback line.

12. The image reading apparatus according to claim 9,
- wherein the image controller is configured to supply electric power to the image reader through the cable,
- wherein the image controller includes a protection element configured to be melted to stop the electric power supply when an electric current of a predetermined amount or more flows through a supply line of the electric power, and a power supply monitor configured to check the melting of the protection element, and
- wherein the image controller is configured to check whether the electric power is normally supplied based on a result of checking the melting of the protection element by the power supply monitor.

13. The image reading apparatus according to claim 9,
- wherein the feedback portion is formed of a feedback line branching out from the third signal line and being connected to the image controller,
- wherein the image controller is configured to supply electric power to the image reader through the cable,
- wherein the image controller includes a protection element configured to be melted to stop the electric power supply when an electric current of a predetermined amount or more flows through a supply line of the electric power, and a power supply monitor configured to check the melting of the protection element, and
- wherein the image controller is configured to:
  - detect a connection state of the cable at startup or before operation of the image reader is started;
  - end processing when the cable is not normally connected;
  - when the cable is normally connected, check whether data is normally written in the image reader by writing data in the image reader and reading the written data from the image reader;
  - operate the image reader when the data is normally written in the image reader;
  - when the data is not normally written in the image reader, check whether the electric power is normally supplied based on a result of checking the melting of the protection element by the power supply monitor;
  - end the processing when the electric power is not normally supplied; and
  - when the electric power is normally supplied, transmit signals to the third signal line, and check a connection state between the image controller and the cable based on a number of transmitted signals and a number of signals received through the feedback line.

14. The image reading apparatus according to claim 13, wherein the image controller is further configured to:
- determine, when the cable is not normally connected, that the cable is disconnected or broken;
- determine, when the electric power is not normally supplied, that an abnormality occurs in a power supply;
- determine, when the number of transmitted signals and the number of signals received through the feedback line are the same, that the image reader is abnormal; and
- determine, when the number of transmitted signals and the number of signals received through the feedback line are different, that the image controller is abnormal.

15. The image reading apparatus according to claim 9, wherein the cable is a flexible flat cable.

16. The image reading apparatus according to claim 9, wherein the signal returned back to the image controller by the feedback portion is acquired from a point in the cable in front of the image reader substrate before the signal is received by the image reader.

* * * * *